(12) United States Patent
Chow et al.

(10) Patent No.: US 9,767,208 B1
(45) Date of Patent: Sep. 19, 2017

(54) RECOMMENDATIONS FOR CREATION OF CONTENT ITEMS

(71) Applicant: Amazon Technologies, Inc., Seattle, WA (US)

(72) Inventors: Matthew Chow, Seattle, WA (US); Chad Howard Young, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 343 days.

(21) Appl. No.: 14/668,807

(22) Filed: Mar. 25, 2015

(51) Int. Cl.
*G06F 17/30* (2006.01)
*G06Q 50/00* (2012.01)

(52) U.S. Cl.
CPC .. *G06F 17/30867* (2013.01); *G06F 17/30598* (2013.01); *G06F 17/30873* (2013.01); *G06Q 50/01* (2013.01)

(58) Field of Classification Search
CPC ......... G06F 17/30867; G06F 17/30598; G06F 17/30873
USPC .......................................................... 707/738
See application file for complete search history.

(56) References Cited

U.S. PATENT DOCUMENTS

| | | | |
|---|---|---|---|
| 7,694,222 B2 | 4/2010 | Steen et al. | |
| 2002/0112004 A1 | 8/2002 | Reid et al. | |
| 2003/0214528 A1 | 11/2003 | Pierce et al. | |
| 2005/0069847 A1 | 3/2005 | Carter | |
| 2005/0120294 A1 | 6/2005 | Stefanison et al. | |
| 2006/0149616 A1 | 7/2006 | Hildick-Smith | |
| 2006/0184566 A1* | 8/2006 | Lo | G06F 17/30038 |
| 2006/0242554 A1 | 10/2006 | Gerace et al. | |
| 2008/0004942 A1 | 1/2008 | Calabria | |
| 2008/0077568 A1 | 3/2008 | Ott | |
| 2008/0162510 A1 | 7/2008 | Baio et al. | |
| 2008/0221987 A1* | 9/2008 | Sundaresan | G06Q 30/02 705/14.54 |
| 2008/0256066 A1 | 10/2008 | Zuckerman et al. | |
| 2009/0070426 A1 | 3/2009 | McCauley et al. | |
| 2009/0263777 A1 | 10/2009 | Kohn | |
| 2010/0076818 A1* | 3/2010 | Peterson | G06Q 30/0245 705/59 |
| 2010/0174579 A1 | 7/2010 | Hughes | |
| 2010/0312702 A1 | 12/2010 | Bullock | |
| 2011/0004477 A1 | 1/2011 | Bansal et al. | |
| 2011/0225203 A1 | 9/2011 | Hart-Davidson et al. | |
| 2012/0013114 A1 | 1/2012 | Glosh et al. | |
| 2012/0150997 A1 | 6/2012 | McClements, IV | |
| 2012/0265570 A1 | 10/2012 | Hegazi | |

(Continued)

OTHER PUBLICATIONS

Huang, Zan, et al., "A Graph-based Recommender System for Digital Library", JCDL '02, Portland, OR, Jul. 13-17, 2002, pp. 65-73.*

(Continued)

*Primary Examiner* — Robert Stevens
(74) *Attorney, Agent, or Firm* — Lee & Hayes, PLLC (57) ABSTRACT

A user may request guidance regarding a topic in which the user wishes to create a content item about. Based at least partly on one or more keywords that are representative of the topic, a user sentiment of consumers with respect to the topic may be determined. A recommendation that relates to the topic and that may be based on an inventory of items within an item category associated with the topic may be provided to the user.

20 Claims, 7 Drawing Sheets

(56) References Cited

U.S. PATENT DOCUMENTS

| | | | |
|---|---|---|---|
| 2012/0284310 A1 | 11/2012 | Yager | |
| 2012/0324393 A1 | 12/2012 | Mbenkum et al. | |
| 2013/0030896 A1 | 1/2013 | Mai-Tal et al. | |
| 2013/0073366 A1* | 3/2013 | Heath | G06Q 30/0261 705/14.25 |
| 2013/0073400 A1* | 3/2013 | Heath | G06Q 30/02 705/14.73 |
| 2013/0086484 A1 | 4/2013 | Antin et al. | |
| 2013/0218733 A1 | 8/2013 | Rago et al. | |
| 2013/0218961 A1 | 8/2013 | Ho | |
| 2014/0180825 A1* | 6/2014 | Ramer | G06Q 30/0269 705/14.64 |
| 2014/0181001 A1 | 6/2014 | Cudak et al. | |
| 2014/0281895 A1 | 9/2014 | Tay et al. | |
| 2014/0297658 A1* | 10/2014 | Kanigsberg | G06F 17/30867 707/750 |
| 2014/0297743 A1 | 10/2014 | Zyto et al. | |
| 2014/0344718 A1* | 11/2014 | Rapaport | H04L 51/32 715/753 |
| 2015/0052427 A1 | 2/2015 | Vagell et al. | |
| 2015/0178279 A1 | 6/2015 | Chen | |

OTHER PUBLICATIONS

Arora, Neeraj, et al., "Putting one-to-one marketing to work: Personalization, customization, and choice", Marketing Letters, vol. 19, Issues 3-4, Dec. 2008, pp. 305-321.*

Office Action for U.S. Appl. No. 14/042,124, mailed on Aug. 27, 2015, Cherukuri et al., "Story Development and Sharing Architecture: Contribution Recognition", 16 pages.

Office Action for U.S. Appl. No. 14/041,836 mailed on Aug. 31, 2015, Cherukuri et al., "Story Development and Sharing Architecture", 16 pages.

Office Action for U.S. Appl. No. 14/042,124, mailed on Jan. 26, 2017, Cherukuri et al., "Story Development and Sharing Architecture: Contribution Recognition", 26 pages.

Silverman, "Reddit: A Beginner's Guide," retrieved on Jan. 10, 2017 at <<http://mashable.com/2012/06/06/reddit-for-beginners/#A1CJ2kE5hEqx>>, Mashable, Published Date Jun. 6, 2012, 7 pages.

Office Action for U.S. Appl. No. 14/042,019, mailed on Dec. 17, 2015, Cherukuri et al., "Story Development and Sharing Architecture: Predictive Data", 14 pages.

Office Action for U.S. Appl. No. 14/042,124, mailed on Feb. 1, 2016, Cherukuri et al., "Story Development and Sharing Architecture: Contribution Recognition", 25 pages.

Office Action for U.S. Appl. No. 14/042,019, mailed on Jun. 17, 2016, Cherukuri et al., "Story Development and Sharing Architecture: Predictive Data", 21 pages.

Office Action for U.S. Appl. No. 14/041,836, mailed on Jun. 29, 2016, Cherukuri et al., "Story Development and Sharing Architecture", 21 pages.

Office Action for U.S. Appl. No. 14/042,124, mailed on Jul. 28, 2016, Cherukuri et al., "Story Development and Sharing Architecture: Contribution Recognition", 24 pages.

U.S. Appl. No. 14/042,019, filed Sep. 30, 2013, Cherukuri et al., "Story Development and Sharing Architecture: Predictive Data," 54 pages.

* cited by examiner

RECOMMENDATIONS FOR CREATION OF CONTENT ITEMS

BACKGROUND

Individuals frequently invest a significant amount of resources (e.g., time, money, research, etc.) when creating content (e.g., books, articles, music, etc.). For instance, although an author may have the requisite amount of knowledge and expertise to create the content, such as a textbook, the author may not know what aspects of the textbook he/she should focus on or emphasize. Accordingly, many authors or would-be authors may be discouraged from creating content due to the uncertainty of what to write about and/or the question of whether there will be a return on investment of the time, money, research, etc., spent creating the content. This may result in less interesting and relevant content being created for public consumption, which may deprive consumers, students, etc., of content that may be of particular interest. This uncertainty experienced by authors could be reduced or eliminated entirely by improvements in technology. This leads to the possibility of new technology enabling novel methods and systems involving recommending content, topics, etc., to authors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems and processes described herein provide a platform (e.g., a website, a portal, a self-service interface, an application accessible via a user device, etc.) in which users may receive recommendations and/or feedback relating to topics for content items. More particularly, a user (e.g., an author) may be interested in creating a content item, such as a book, and may be interested in focusing on a particular topic (e.g., calculus, zombies, etc.). Prior to writing the book, the user may provide this topic to a service provider, which may facilitate the creation and publishing of content items, for the purpose of receiving guidance regarding the topic of interest. In response, the service provider may provide initial guidance to the user that may help the user choose a topic that has the highest, or at least a good, likelihood of success.

To determine such guidance/recommendations, the service provider may identify one or more keywords that relate to, or are associated with, the topic provided by the user. The service provider may then parse various types of data using the one or more keywords to determine user sentiment with respect to the topic. Such data may include previous user interaction with items offered by the service provider (e.g., an extent to which users purchased, viewed, searched for, etc., items), feedback provided by users (e.g., user reviews), and user behavior associated with consuming content (e.g., reading behavior, etc.). The extent and/or frequency in which the keywords appear in the data may indicate the user sentiment for that particular topic, where the user sentiment may represent the extent to which users are likely to become interested in that topic.

Based on the user sentiment, the service provider may provide guidance and/or recommendations relating to the topic previously identified by the user. For instance, the service provider may indicate whether content items relating to that topic are likely to succeed, which may be based on the predicted commercial success of content items relating to that topic, an extent to which users are likely to be interested in content items relating to that topic, and so on. The service provider may also identify sub-topics within the topic that are more likely to succeed, and/or may identify other topics that are more likely to succeed. As a result, the user may receive guidance regarding the expected success of content items within a particular topic, and the likelihood that consumers are to become interested in the topic, before spending a significant amount of resources (e.g., time, energy, money, research, etc.) to create a content item (e.g., writing a book) relating to that topic.

In additional embodiments, the service provider may also provide guidance and/or recommendations to a user while the user is creating a content item (e.g., writing a book). More particularly, provided that the user has provided access to the content item, the service provider may identify or extract one or more keywords from the content item that are representative of one or more topics associated with the content item. The service provider may then leverage the data described above to determine the user sentiment relating to the one or more topics. Therefore, as the user is creating the content item, the service provider may continue to provide guidance regarding the likelihood of success of the content item. That is, based on the determined user sentiment for the topic, the service provider may indicate that the content item as written is likely to succeed, or may recommend focusing on a particular aspect of the content item.

A recommendation for users to create content items associated with a particular topic may also be based on user sentiment relating to that topic and an inventory of items within a category associated with the topic. For instance, the service provider may determine user sentiment with respect to a particular topic (e.g., a likelihood that consumers are to become interested in that topic). The service provider may then identify one or more categories that relate to that topic, where the categories may include items (e.g., products, services, etc.) that are offered for sale by the service provider. The service provider may determine a current inventory of items within a particular one of the category of items. Since the user sentiment associated with the topic may indicate user demand for items relating to that topic, if the current inventory of items within the identified category is relatively low, the service provider may recommend that users create content items (e.g., books, articles, movies, etc.) that are associated with that item category. That is, the predicted user demand for the topic and the low inventory of items included in the category relating to that topic may indicate that items within the category are likely to become of interest to users.

For the purposes of this discussion, the content items (also referred to as "digital items" or "digital content items") may be manifested in many different ways including, for example, as text-based items, audio items, video items, multimedia items, graphical items, and so forth. In some embodiments, the architecture and techniques are described in the context of eBook reader devices and electronic books. The terms "electronic book" and/or "eBook," as used herein, include electronic or digital representations of printed works (or portions of printed works), as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of content items, such as music, audio books, video, and other content items that people watch, listens to, consume, or otherwise experience.

Further, eBooks are just one form of a common work. The common work may represent the text of the book regardless of the format. For example, an eBook may also be released in other forms, such as paperback, hardcover, and audio. Although a rights holder such as a publisher, author, distributor, etc. may have rights such as a copyright in the common work, multiple copies of that work may be owned by various end users. If the work is manifested in digital form (e.g., eBook), digital rights management (DRM) or other technological features may prevent lending or may limit a number of times that the digital copy of the common work may be lent. Thus, unlike paperback or hardback versions of a book, the ability to lend an eBook (or other digital item) may be a limited resource that has a high value because of the scarceness of "lends" associated with the eBook.

Figure 1:
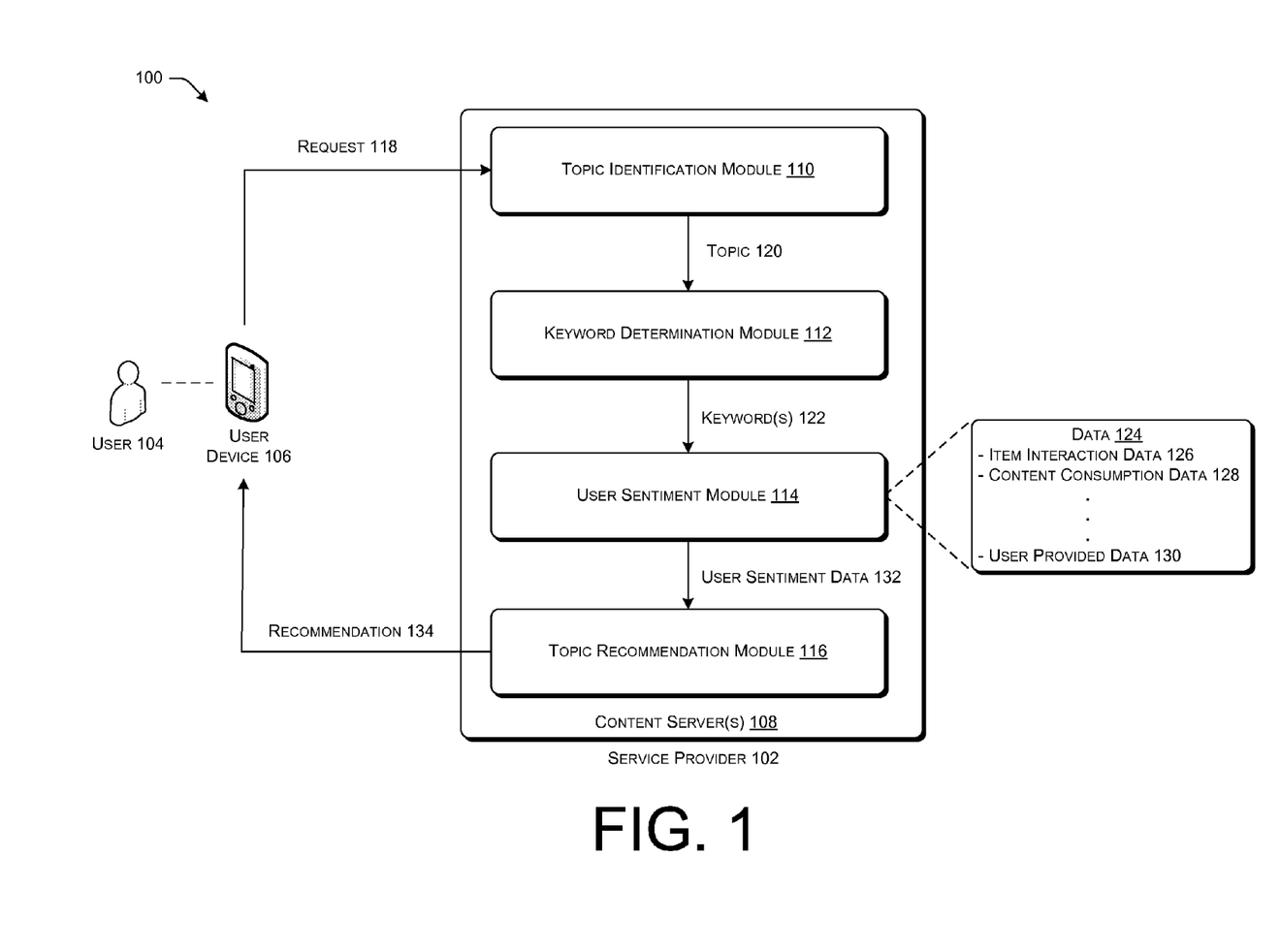
FIG. 1 illustrates an example system for providing recommendations for content topics based at least partly on data indicating user sentiment.

FIG. 1 illustrates an example system 100 for assisting users in developing and/or publishing content items, such as books. More particularly, the system 100, and a service provider 102 in particular, may receive an indication from a user 104 that the user 104 would like to create a content item, such as a book, for publication. However, the user 104 may be hesitant to write a book due to the amount of resources (e.g., time, money, research, etc.) that the user 104 would need to invest to write the book. The user 104 may also be concerned whether he/she would receive an adequate return on investment in exchange for writing the book. Moreover, the user 104 may be unaware of whether consumers would be interested in the topic associated with the book, and/or whether consumers would actually acquire (e.g., purchase, rent, borrow, download, etc.) the book.

Therefore, there may be various types of information that the user 104 would find helpful in determining whether he/she should write the book (or create a different type of content item, such as an article, a music album, etc.). In addition to having access to this information before writing the book, such information would also be helpful while the user 104 is writing the book. For instance, the user 104 could utilize this information to determine what to write about, and/or to determine if he/she should adjust or refocus the subject matter of the book while the user 104 is currently writing the book. The service provider 102 may leverage various types of data to determine user sentiment with respect to the topic or category associated with the book, where the user sentiment may indicate current interests or preferences of users with respect to various topics (e.g., calculus, zombies, autobiographies, etc.), the popularity of various topics, and/or the likelihood that the topic is to become popular or of interest to consumers. As a result, the service provider 102 may leverage the data in order to provide guidance and/or recommendations to the user 104 in order to increase the likelihood that the book will be of interest to consumers and/or that the book will experience commercial success.

As shown in FIG. 1, the system 100 may include the service provider 102, one or more users 104, and one or more user devices 106 associated with the users 104. Moreover, the service provider 102 may be associated with one or more devices (e.g., content server(s) 108) that maintain one or more modules, such as a topic identification module 110, a keyword determination module 112, a user sentiment module 114, and a topic recommendation module 116.

In certain embodiments, the service provider 102 may maintain, or otherwise be associated with, one or more sites (e.g., website), interfaces (e.g., self-service interfaces), or applications that are accessible by the users 104 via the user devices 106. One site may serve as an online or electronic commerce (e-commerce) marketplace that offers items for sale to consumers. The items may include physical or digital products that are offered for sale by the service provider 102 or that are offered by the service provider 102 on behalf of merchants. That is, the merchants may provide the items for sale via the electronic marketplace. Moreover, services offered via the electronic marketplace may be performed by the service provider 102 and/or the merchants.

As stated above, the site may present (e.g., display) the one or more content items, which may include any type of digital or electronic content, such as eBooks, other textual files, audio files (e.g., music, audio books, etc.), video files (e.g., movies, television shows, etc.), and so on. In particular, the content items may include manuscripts, articles, and other works of literature that are created by one or more authors, such as the users 104. The authors may provide the content items to the service provider via the electronic marketplace or a different site, interface, etc., that is operated by the service provider 102. As a result of the authors providing the content items to the service provider 102, the service provider 102 may select some or all of the content items for publication. The authors may also self-publish content items via a site hosted by the service provider 102. If selected for publication, the content items will be publicly available for purchase and consumption via the service provider 102 or a different entity (e.g., one or more merchants).

As illustrated in FIG. 1, the user 104 may submit a request 118 to the topic identification module 110 of the service provider 102 via a corresponding user device 106. The request 118 may be made via a site associated with the service provider 102 and the information included in the request 118 may vary. In particular, is some instances, the user 104 may have in mind a topic 120 that he/she would like to create a content item about. For instance, the user 104 may know that he/she would like to write a book about a particular topic, such as algebra or zombies, and may identify the topic 120 via the request 118. However, the user 104 may be hesitant to begin writing the book due to uncertainty surrounding whether a book relating to such a topic 120 would be of interest to consumers. In other embodiments, the user 104 may want to create a content item (e.g., a book), but may have several different topics in mind. Moreover, the user 104 may want to create a content item about any subject or topic 120, and then may rely upon the service provider 102 to recommend topics in which to create the content item about. In addition to identifying a topic 120 (e.g., calculus), the user 104 may optionally identify one or more keywords 122 that relate to the topic 120 (e.g., derivatives, differential, integral, etc.).

Upon receiving the request 118, the topic identification module 110 may identify the topic 120 that the user 104 would like to create a content item about. As noted above, the topic 120 may be indicated in the request 118, or the topic identification module 110 may identify a topic 110 for the user 104, as will be discussed in additional detail below. The identified topic 120 may then be provided to the keyword determination module 112 of the service provider 102.

The keyword determination module 112 may identify one or more keywords 122 that are related to the topic 120. In some instances, the keywords 122 may be provided by the user 104 via the request 118. However, in other embodiments, the keyword determination module 112 may identify one or more words, phrases, etc., that are determined to represent the topic 120. For example, provided that the topic 120 is "calculus," the keywords 122 that represent the topic 120 may include "derivative," "differential," and/or "integral." In some embodiments, the keywords 122 may be assigned varying weights depending upon how accurately the keywords 122 represent the identified topic 122. That is, a first keyword 122 that is very relevant to the topic 120 may be provided a higher weight than a second keyword 122 that is less related, but is still related, to the topic 120.

Moreover, the user sentiment module 114 may determine or predict a user sentiment of consumers with respect to the topic 120 utilizing the one or more keywords 122. More particularly, the user sentiment module 114 may leverage various types of data 124 to determine the user sentiment of consumers with respect to the topic 120, where the user sentiment may be representative of the interests or preferences of consumers with respect to the topic 120, the popularity of the topic 120, the popularity of items relating to the topic 120, and so on. The user sentiment may be determined by searching the data 124 for the keywords 122. The extent to which the keywords 112 appear within the data 124 may indicate the user sentiment, or the level of consumer interest in, the topic 120. The extent to which the keywords 112 appear within the data 124 may also allow the service provider 102 to predict whether the topic 120 is likely to become of interest to consumers, or to predict whether the topic 120 is likely to become popular amongst consumers.

Various types of data 124 may be stored by, and/or accessible to, the service provider 102. For instance, amongst other types of data, the data 124 may include item interaction data 126, content consumption data 128, and user provided data 130. In some embodiments, the item interaction data 126 may include any type of data that indicates user interaction with items offered by the service provider 102. For instance, the item interaction data 126 may include the extent to which items (e.g., physical products, digital items, etc.) have previously been acquired (e.g., purchased, leased, traded for, borrowed, downloaded, etc.), searched for, viewed, selected (e.g., clicked on), added to a saved-items list (e.g., a wish-list), and so on.

Moreover, the content consumption data 128 may correspond to any data that indicates the behavior of users with respect to the consumption of content items, such as reading an eBook. More particularly, the content consumption data 128 may include identification of content items consumed by users, the rate in which content items are consumed, the extent to which content items are highlighted, annotated, bookmarked, etc., the frequency in which content items are accessed, an amount of time in which users spent consuming content items, or portions of the content item, and so on. Moreover, the use provided data 130 may include any type of data provided by users, such as information included in a user profile or user account (e.g., interests or preferences of users), customer reviews of items, information discussed in forums associated with the service provider, social network data, etc. Although some examples of the data 124 are discussed above, the data 124 will be discussed in additional detail with respect to FIG. 4.

Additional user data 124 may include data that indicates user interest in content items prior to those content items becoming published and/or available for public consumption. Such pre-publication data may be indicative of which topics, categories, genres, etc., are likely to become of interest to consumers. For instance, assume that multiple authors drafted manuscripts, or are currently drafting manuscripts, that relate to the same or similar topics, and that the authors are seeking guidance from the service provider 102. Although such manuscripts may not have been made available for public consumption, the fact that multiple authors are writing about the same topic may indicate that the topic(s) are likely to become popular amongst consumers.

As another example, assume that an author has provided a manuscript to the service provider 102. In some embodiments, the service provider 102 may allow a group of users 104 (e.g., top customers) to review the manuscript and provide their feedback. As a result, the service provider 102 may receive positive feedback from some or all of the group of users 104. Therefore, although the topic of the manuscript may not currently be of interest to consumers, which may be represented by content items or other items relating to that topic having a relatively low amount of sales or downloads, positive user feedback during the pre-publication phase may indicate that the topic is likely to become of interest to consumers.

The various types of data 124 can be stored in the same location (e.g., a single database) or in multiple different locations (e.g., multiple databases). In either scenario, the service provider 102 may conduct a search for the keywords 122 within the data 124. That is, the keyword search may determine whether the keywords 122 were found in the data 124 and, if so, the extent to which (e.g., the frequency in which) the keywords 122 were found in the data 124. For example, the service provider 102 may search the data 124 for the keyword, "derivative," which relates to the topic 120 "calculus," and determine the extent to which this keyword 122 appeared within the data 124. This keyword 124 may have been highlighted in eBooks, included in user reviews for items, included in the description of an item that was offered for sale to consumers, and so on.

The extent to which the keywords 122 (e.g., "derivative") are present in the data 124 may indicate the extent to which consumers are interested in the identified topic 120. That is, the results of the keyword search may represent the popularity of that particular topic 120, or categories or genres related to that topic 120, at a given point in time. The results of the keyword search may also represent the likelihood that the topic 120 is to become of interest to consumers. The overall consumer interest level of the topic 120 may be referred to as user sentiment data 132. The user sentiment data 132 may be assigned a value that indicates the popularity of the topic 120 as compared to other topics.

Based at least partly on the user sentiment data 132, the topic recommendation module 116 may provide a recommendation 134 to the user 104. The recommendation 134 may provide guidance as to topics that that are, or are not, likely to be off interest to consumers. Provided that the user 104 identified the topic 120 in the request 118, the recommendation 134 may specify that the user 104 should create a content item relating to that topic 120. The topic recommendation module 116 may make such a recommendation 134 if a value associated with the user sentiment data 132 meets or exceeds a particular threshold, which may indicate a likelihood that the topic 120 is likely to become of interest to consumers. However, the recommendation 134 may indicate that the topic 120 is not likely to become of interest to consumers, which may be determined if the value associated with the use sentiment data 132 is less than the threshold. In that instance, the recommendation may identify one or more other topics that are more likely to be of interest to consumers, or that are determined to currently be popular amongst consumers. That is, the recommendation 134 may be based on whether the user sentiment data 132 indicates that content items relating to the topic 120 would be successful, if created, where the success of the content items may be based on the likelihood that consumers would purchase, download, search for, view, etc., the content items. The recommendation 134 may be provided to the user 104 in any manner. For instance, the recommendation 134 may be presented via a website or self-service interface associated with the service provider 102.

In some embodiments, the user 104 may seek guidance regarding a content item (e.g., a book) that the user 104 is currently creating (e.g., writing). For instance, the user 104 may have previously received the recommendation 134 from the service provider 102 regarding a topic 120 to create a content item about. Alternatively, the user 104 may have already chosen a topic 120 and decided to create a content item relating thereto. However, as the user 104 is creating the content item, the interests of consumers and/or the popularity of topics, genres, categories, etc., may change. As a result, the user 104 may desire to know whether the topic 120 relating to the unfinished content item is still popular amongst consumers.

Accordingly, the request 118 may include or enclose a copy of an unfinished content item (e.g., a book) that is currently being created (e.g., written). The request may otherwise provide access to the unfinished content item. The topic identification module 110 and/or the keyword determination module 112 may determine a topic 120 and/or one or more keywords 122, respectively, associated with the unfinished content item. In particular, the service provider 102 may extract one of more words or phrases (i.e., keywords 122) from the unfinished content item that most accurately represent the subject matter described in the content item. The topic 120 associated with the content item may be determined from the extracted words or phrases.

As discussed above, the service provider 102 may then determine the user sentiment and/or interest level associated with the topic 120 based on the extracted keywords 122 and in view of the data 124. The topic recommendation module 116 may then provide a recommendation 134 to the user 104, where the recommendation 134 may provide guidance regarding whether the user 104 should continue to create the unfinished content item in view of the previously identified topic 120. That is, if the user sentiment data 132 indicates that the topic 120 is still popular amongst consumers, the service provider 102 may recommend that the user 104 continue to create the content item. However, if the user sentiment data 132 indicates that consumers are not particularly interested in the topic 120, or are likely to become less interested in that topic 120, the recommendation 134 may identify other topics that have a higher consumer interest level. Alternatively, the service provider 102 may identify certain portions of the content item that are likely to be of particular interest to consumers. For instance, if the user sentiment data 132 indicates that consumers are likely to be interested in a certain chapter or portion of the book currently being written, the service provider 102 may recommend that the user 104 should expand on that chapter/portion of the book. As a result, users 104 may receive guidance as to a content item to create (e.g., a book to write) before and/or after the user 104 has begun creating the content item.

Figure 2:
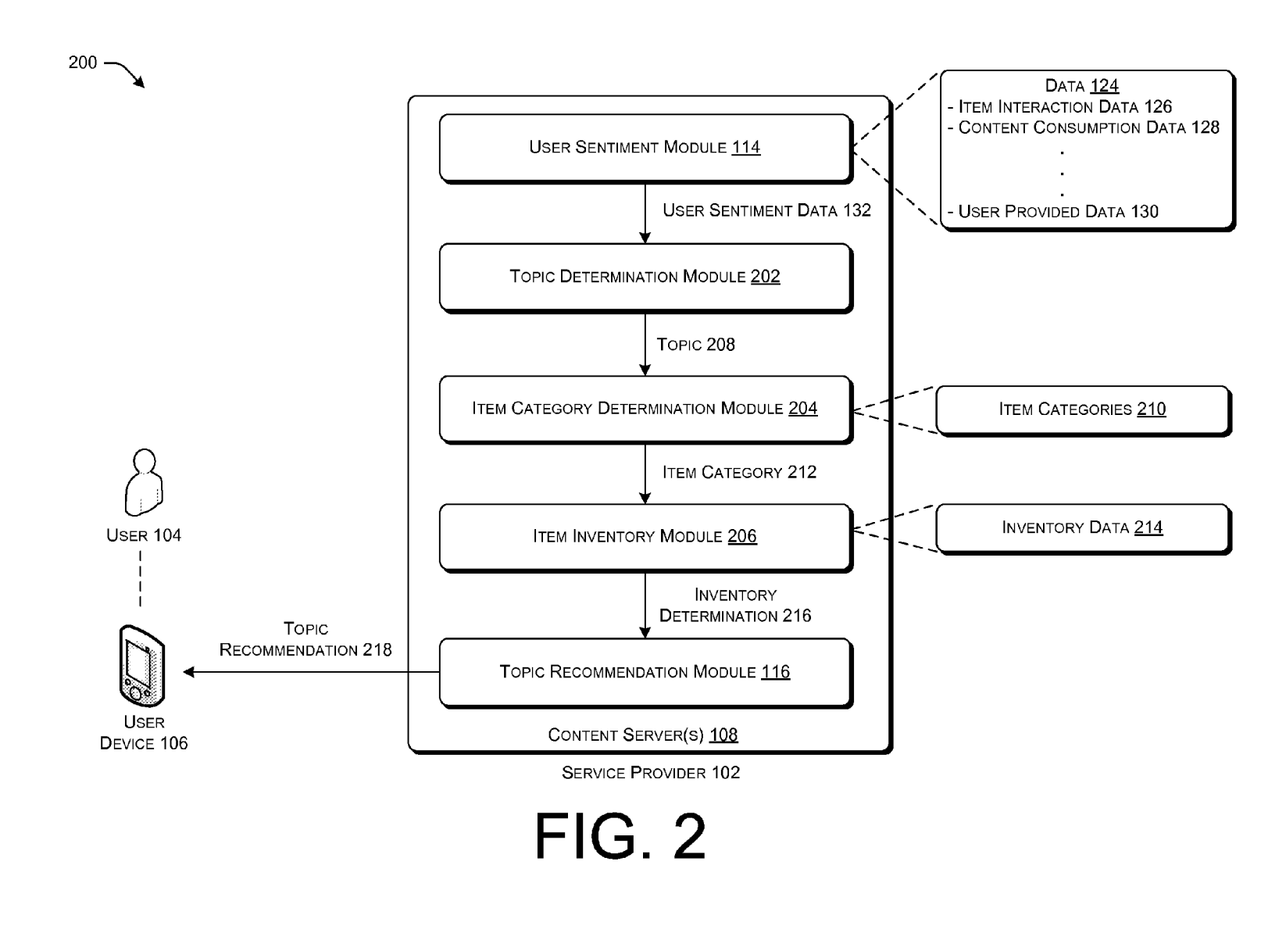
FIG. 2 illustrates an example system for providing recommendations for content topics based at least partly on data indicating user sentiment and/or inventory data.

FIG. 2 illustrates an example system 100 for assisting users in developing and/or publishing content items based at least partly on user sentiment of consumers and/or inventory data. More particularly, the system 200 may identify items, topics, categories, and/or genres that are about to become of particular interest to consumers. That is, the system 200 may determine that the popularity of various items, topics, categories, and/or genres amongst consumers is trending upwards, although such items, topics, categories, and/or genres may not currently be popular with consumers. The system 200 may make such a determination based on various types of data and/or actions previously taken by consumers. Since the data indicates that consumers are becoming more interested in that particular item, topic, category, genre, etc., the service provider 102 may recommend that users 104 create content items (e.g., books) relating to that item, topic, category, genre, etc. This recommendation may also be based on inventory data that indicates a current inventory of content items within a category of items that is related to the topic.

As an illustrative example, the service provider 102 may determine that the popularity of the topic "zombies" is trending upwards based on various types of data, such as data indicating that an increased number consumers have watched a trailer for a zombie-related movie, an increase of sales of zombie-related merchandise or toys, mentions of "zombies" on various social media networks or sites, etc. As a result, due to the perceived user demand of zombie-related items, the service provider 102 may inform users (e.g., authors) that they should create content items (e.g., write books) relating to the topic of "zombies." This may especially be the case if it is determined that the current inventory for zombie-related content items is relatively low, indicating that the current inventory may be insufficient to satisfy the user demand for a topic (i.e., zombies).

As shown, the system 200 illustrated in FIG. 2 may include the service provider 102, a user 104, and a user device associated with the user 104. The service provider 102 may be associated with one or more content server(s) 108, which may include various modules. Although the content server(s) 108 may store or be associated with any number of modules, the modules may include the user sentiment module 114, a topic determination module 202, an item category determination module 204, an item inventory module 206, and the topic recommendation module 116.

As illustrated in FIG. 2, and as discussed above with respect to FIG. 1, the user sentiment module 114 may determine user sentiment data 132 based at least partly on various types of data 124. The data 124 may include at least the item interaction data 126, the content consumption data 128, and the user provided data 130. In particular, based on actions taken by consumers with respect to items (e.g., physical products, digital items, services, etc.) being offered by the service provider 102, consumer engagement analytics relating to the consumption of digital items (e.g., eBooks, etc.), and other types of data provided by consumers (e.g., user reviews, user feedback, specified interests/preferences, etc.), the user sentiment module 114 may identify current interests or preferences of consumers. The user sentiment data 132 may also indicate the beginning of emerging trends regarding which topics, categories, items, genres, etc., are becoming popular amongst consumers, although such topics, categories, items, genres, etc., may not currently be popular.

That is, based on the user sentiment data 132, the topic determination module 202 may determine or predict a topic 208 that is likely to become an emerging trend, that is about to become of particular interest to consumers, and/or that is likely to become popular amongst consumers. The determination of the topic 208 may be based at least partly on a value representative of the user sentiment data 132 being at or above a certain user sentiment threshold. In some embodiments, the user sentiment data 132 may indicate a user demand for content items associated with the topic 208.

In some embodiments, the determination of whether a topic 208 is likely to become of interest among consumers may be based on a change in a value over time. More particularly, a first value may be based on a frequency in which keywords are found within the user data 124 at a first time. To determine the first value, the service provider 102 may consider the frequency of one or more keywords in different types of data (e.g., purchase history data, user reviews, eBook consumption, etc.). A second value at a second, subsequent time may then be determined using the same inputs (e.g., the keywords, the different types of user data 124, etc.). The service provider 102 may determine a difference between the first value and the second value. If the increase from the first value to the second value is greater than a threshold, the service provider 102 may determine that consumers are likely to become interested in one or more topics in which the keywords represent.

In various embodiments, the service provider 102 may offer items to consumers via an electronic site or marketplace (e.g., a website hosted or operated by the service provider 102), where the service provider 102 may be a source of the items. Alternatively, the service provider 102 may offer the items to consumers via the electronic site/marketplace on behalf of merchants that are a source of the items. The items being offered to consumers may be categorized within multiple item categories 210, and often sub-categories within individual ones of the item categories 210. As a result of determining the topic 208, the item category determination module 204 may determine an item category 212 of the item categories 210 that is associated with, or relates to, the topic 208. That is, the item category 212 may include items that are believed to be associated with the determined topic 208.

The service provider 102 may also have access to inventory data 214 relating to items within the various item categories 210. In particular, for the items that are determined to be included in the individual item categories 210, the service provider 102 may determine the quantity of those items that are available to be provided to consumers, if purchased by consumers. As a result, for the item category 212, the item inventory module 206 may determine the inventory of items (e.g., the quantity of items, the types of items, etc.) included within the item category 212. For a particular item within the item category 212, the inventory data 214 may be represented as the number of items that have been purchased and/or provided to consumers, the number of items remaining that are eligible to be purchased, or any other value that indicates the quantity of the item that the service provider 102 is able to provide to consumers. The inventory data 214 for a particular item may vary as consumers purchase the item, as the service provider 102 produces additional ones of the item, and/or as the merchant provides additional ones of the item. The inventory of items within the item category may be referred to as an inventory determination 216.

The inventory data 214 may also indicate that certain topics 208 and/or item categories 212 are not represented within an item catalog that includes items (e.g., products, services, etc.) that are offered for sale to consumers. That is, for a particular topic 208 that is determined to likely be trending, rather than determining that the inventory within an item category 212 associated with the topic 208 is relatively low, the service provider 102 may instead determine that there is not an item category 212 within the catalog that is associated with the topic 208. The service provider 102 may determine that there is a gap or void within the item catalog. As a result, the service provider 102 may not be offering items that are relevant to the topic 208, which would include items that likely would be of interest to consumers.

In order to determine that the topic 208 is not currently represented by an associated item category 212, the service provider 102 may first identify which item categories 212 are currently within the item catalog. The service provider 102 may then determine which item categories 212 and/or items are related to the previously determined topic 208. If it is determined that an item category 212 associated with the topic 208 does not exist, the service provider 102 may create a new item category 212 and request that authors, merchants, etc., create or provide items relating to that item category 212.

Based at least partly on the user sentiment data 132 and/or the inventory determination 216, the topic recommendation module 116 may provide a topic recommendation 218 to the user 104 and/or to other users 104 that may be interested in creating content items. More particularly, if the user sentiment data 132 indicates an emerging trend that the topic 208 is about to become popular amongst consumers and/or if it is determined that the inventory of items within at least one item category 212 associated with the topic 208 is relatively low, the topic recommendation module 116 may recommend that users 104 create content items relating to that topic 208. That is, the service provider 102 may determine that there is likely to be a particular user demand for content items (e.g., books) relating to the topic 208 and that there is a lack of related items available to consumers, where the items are included within an item category 212 that is determined to be related to the topic 208. The topic recommendation 218 may be based on the idea that the creation of content items relating to this topic 208 may satisfy this perceived user demand.

In some embodiments, the topic recommendation 218 may be provided to users 104 if a first value representing the user sentiment meets or exceeds a first threshold, and/or that a second value representing the inventory of items within the item category 212 is below a second threshold. In response to receiving the topic recommendation 218, users 104 may create content items relating to the topic 208 and provide such content items to the service provider 102. At that point, and as discussed with respect to FIG. 1, the service provider 102 may provide additional guidance regarding whether consumer are likely to be interested in the content item. In addition, the service provider 102 may verify whether content items provided by users 104 are in fact related to the topic 208 and/or the item category 212.

In some embodiments, the topic recommendation 218 may be based at least partly on the user 104 (e.g., the author) himself/herself. The service provider 102 may determine which content items the user 104 has created, authored, edited, provided feedback for, etc., in order to determine the categories of content items that the user 104 is likely to be interested in. That is, the service provider 102 may consider the history of the user 104 when providing the topic recommendation 104. Since users 104 are typically more likely to create content that are of particular interest, and/or content that the users 104 have experience or expertise with, the topic recommendation 218 provided to the user 104 may relate to categories of content items that the user 104 has previously been associated with, and/or categories of content items that are similar or related to what the user 104 has previously authored.

In some embodiments, the service provider 102 may utilize any algorithms or machine intelligence (e.g., machine learning, regression analysis, cluster analysis, artificial intelligence, etc.) to determine the experience, expertise, and/or style of a particular user 104/author. The experience, expertise, and/or style of the user 104 may be with respect to different categories of content items (e.g., books) that the user 104 is typically associated with. This information relating to the user's 104 previous works may be considered when generating the topic recommendation 218.

In additional embodiments, when generating the topic recommendation 218, the service provider 102 may also consider the types of consumers that are typically interested in content provided by (e.g., authored by) the user 104. Such consumers may be consumers that previously acquired (e.g., purchased, rented, downloaded, etc.), searched for, consumed, etc., content items provided by the user 104, as well as well as other content items related to, or within the same category as, content items provided by the user 104. Therefore, the topic recommendation 218 may be based on which content items the user 104 has provided/authored in the past, consumers that have acquired/consumed content by the user 104 (or content related to what the user 104 has provided/authored), and/or a topic 208 that is likely to become of interest to consumers.

Therefore, in order to identify emerging trends that relate to topics that are likely to become of particular interest to consumers, the service provider 102 may monitor a catalog of items that are offered for sale to consumers via an electronic marketplace operated by the service provider 102. More particularly, the service provider 102 may consider the inventory of items within various item categories 210 that make up the catalog. The inventory of items within various item categories 210 may indicate that certain item categories 212 are under saturated, meaning the quantity or type of items within a particular item category 212 are likely not sufficient to satisfy user demand for items within that item category 212. If the service provider 102 determines that a topic 208 related to the item category 212 is likely to become popular, the service provider 102 may request that users 104 create content items relating to that item category 212. That is, provided that the user sentiment data 132 indicates that consumers are more frequently interacting with a certain topic 208, the service provider 102 may look to related item categories 210 within the catalog, and determine whether to recommend that users 104 create content items (e.g., write books) about that item category 212.

In certain embodiments, in order to provide the topic recommendation 218 to users 104, the service provider 102 may first identify item categories 210 that have a relatively low inventory of items. For instance, the service provider 102 may determine that the number of items within an item category 212 is below a threshold, or that the type of different items within the item category 212 is below a threshold. The service provider 102 may then determine one or more keywords 122 that are associated with, or that represent, the item category 212. Using the keywords 122, the service provider 102 may search the data 124 to determine whether consumer activity relating to that item category 212 is increasing or trending upwards, indicating that the topic 208 relating to that item category 208 is likely to become popular amongst consumers.

For example, the service provider 102 may determine, via the electronic marketplace, whether consumers have conducted searches using the keywords 122, whether consumers have purchased items relating to the keywords, and so on. In addition, the service provider 102 may determine whether consumers have searched for items and not made a corresponding purchase from the electronic marketplace, which may indicate that there is insufficient inventory or an insufficient variety of items within the item category 212 to satisfy user demand. This may indicate that the consumer searched for an item, did not find an item that met his/her preferences, and decided to purchase the item from a source different from the electronic marketplace. Based on a determination that a first value associated with the user sentiment 132 is at or above a first threshold, and that a second value associated with the inventory of items within the item category 212 is below a second threshold, the service provider 102 may recommend that users 104 create content items for that item category 212 in order to satisfy an increased user demand for the topic 208.

That is, the topic recommendation 218 may be provided based on a determination of a mismatch between the inventory of items and/or a variety of items within a particular item category 212 and which topics are likely to become more popular and/or of interest to consumers. If the inventory/variety within an item category 212 is relatively low and the predicted user demand for a topic 208 related to the item category 212 is predicted to become relatively high, the service provider may increase the number and/or type of items within that item category 212. This may be done by requesting, via the topic recommendation 218, that users 104 create content items related to the item category 212.

Figure 3:
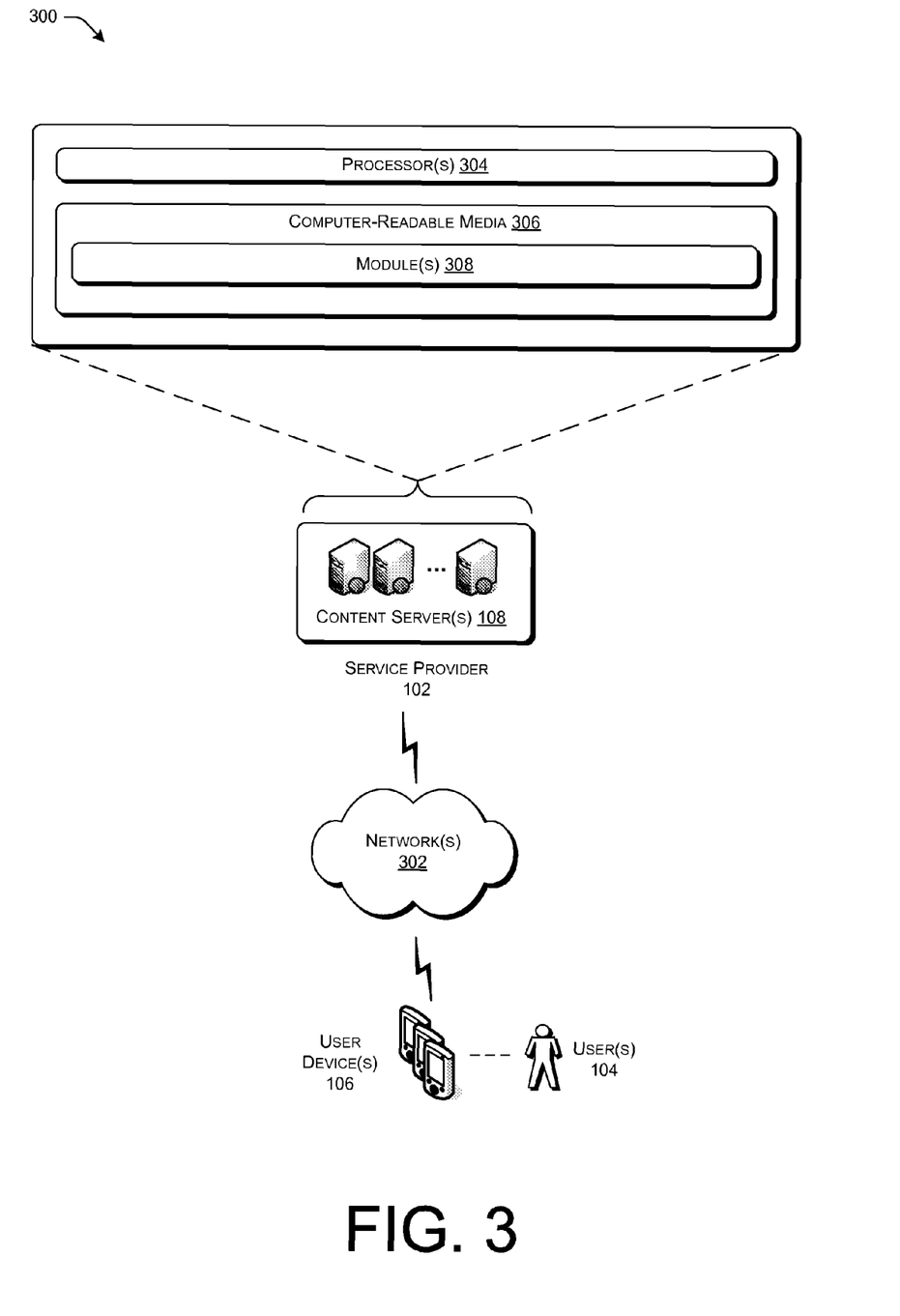
FIG. 3 illustrates an example system that includes multiple devices that facilitate the recommendation of content topics to users.

FIG. 3 illustrates an example system 300 for facilitating the creation of content items by users. More particularly, the system 300 may include the service provider 102, the one or more users 104, the one or more user devices 106 associated with the users 104, and one or more network(s) 302. As shown, the service provider 102 may include, or be associated with, the one or more content server(s) 108, which may include one or more processor(s) 304 and computer-readable media 306. The computer-readable media 306 may maintain one or more modules 308, such as the module illustrated in FIGS. 1 and/or 2, as well as any other modules described herein.

For the purposes of this discussion, the service provider 102 may be any entity, server(s), platform, service, etc., that offers items to consumers for acquisition, and that facilitates the creation of content items, such as books. In some embodiments, he service provider 102 may also be associated with a retail marketplace (e.g., a website) that allows consumers to search for, browse, view, borrow, return, acquire, etc., items (e.g., products, services, digital items, etc.) that are maintained by the service provider 102, and that are possibly maintained on behalf of other entities (e.g., artists, authors, publishers, vendors, other service providers, merchants, etc.).

In some embodiments, the service provider 102 may be equipped with communication technology in order facilitate the operations described herein. The network(s) 302 may be any one or combination of multiple different types of networks, such as the Internet cable networks, cellular networks, wireless networks (e.g., Wi-Fi, cellular, etc.), and wired networks. Moreover, the service provider 102 and the users 104 (via the user devices 106) may communicatively couple to the network(s) 302 in any manner, such as by a wired or wireless connection.

In some embodiments, the users 104 may operate corresponding user devices 106 to perform various functions. The user devices 106 may include one or more processor(s), computer-readable media, and a display. Furthermore, the users 104 may utilize the user devices 106 to browse/search the site/platform that presents items for acquisition.

Moreover, and as shown, the service provider 102 may include the one or more content servers 108, which may include one or more processors 304 and computer-readable media 306. The computer-readable media 306 may include, or be associated with, the module(s) 308. The content servers 108 may also include additional components not listed above that may perform any function associated with the content servers 108. In various embodiments, each of the content servers 108 may be any type of server, such as a network-accessible server.

In various embodiments, the processor(s) 304 may execute one or more modules and/or processes to cause the content servers 108 to perform a variety of functions, as set forth above and explained in further detail in the following disclosure. In some embodiments, the processor(s) 304 may include a central processing unit (CPU), a graphics processing unit (GPU), both CPU and GPU, or other processing units or components known in the art. Additionally, each of the processor(s) 304 may possess its own local memory, which also may store program modules, program data, and/or one or more operating systems. Depending on the exact configuration and type of the content servers 108, the computer-readable media 306 may include volatile memory (such as RAM), non-volatile memory (such as ROM, flash memory, miniature hard drive, memory card, or the like), or some combination thereof. The computer-readable media 306 may be non-transitory computer-readable media that stores computer-executable instructions that, when executed by the one or more processors 304, causes the one or more processors 304 to perform various operations.

FIGS. 4-7 are flow diagrams of illustrative processes for facilitating the creation of content items by users. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
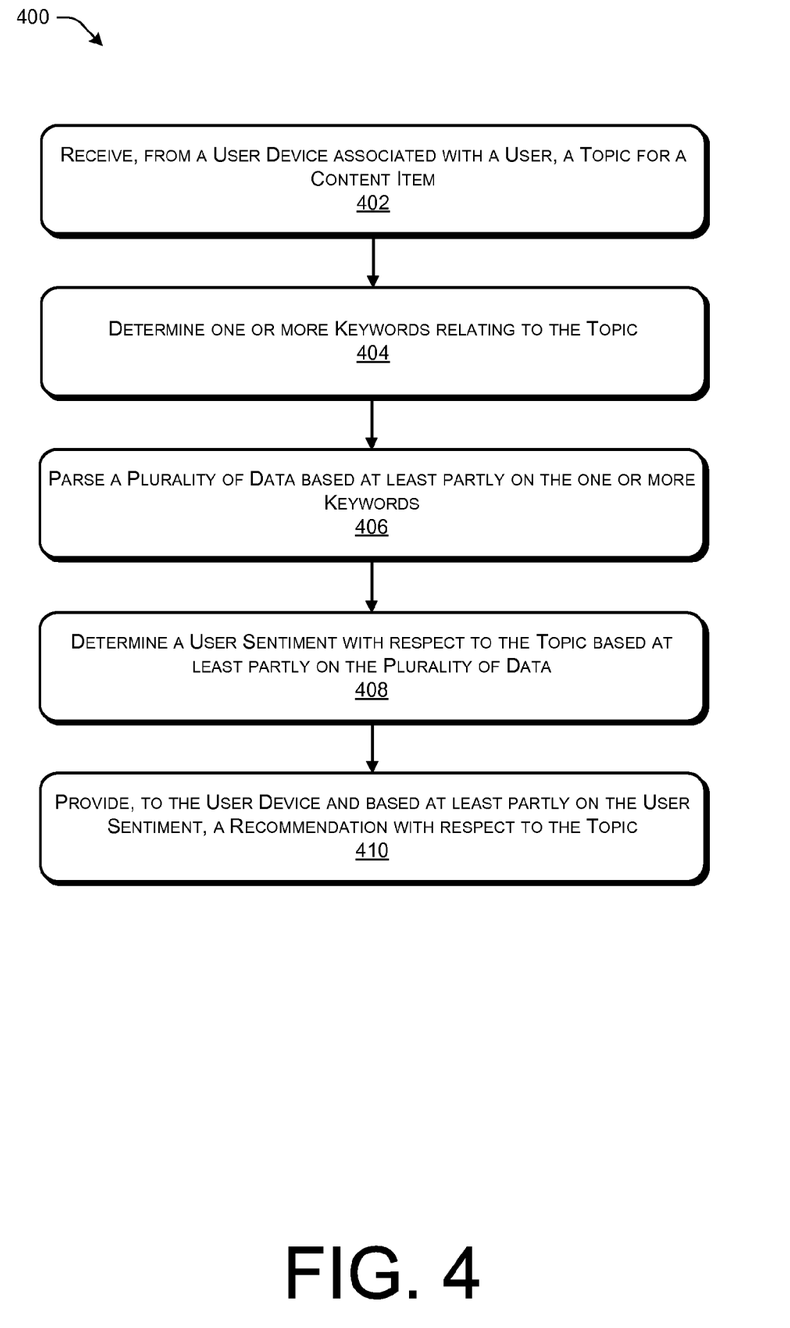
FIG. 4 is a flow diagram illustrating an example process of providing a recommendation for a content topic based at least partly on user sentiment with respect to the content topic.

FIG. 4 is a flow diagram illustrating an example process 400 of providing guidance relating to the creation of content by a user. Moreover, the following actions described with respect to FIG. 4 may be performed by the service provider 102 and/or the content servers 108, as illustrated in, and described with respect to, FIGS. 1-3.

Block 402 illustrates receiving, from a user device associated with a user, a topic for a content item. In particular, a user 104 may desire to create a content item, such as a book, but may be hesitant to begin writing the book due to the resources required to write the book (e.g., time, money, research, etc.) and the uncertainty of receiving a return on investment for writing the book. As a result, the user 104 may submit a request 118 to the service provider 102 that identifies a topic 120 that the user 104 would like to write about. The user 104 may submit the request 118 for the purpose of receiving guidance regarding whether the service provider 102 recommends writing the book about that topic 120.

Block 404 illustrates determining one or more keywords relating to the topic. After identifying the topic 120, the service provider 102 may identify one or more words, phrases, etc. (i.e., the keywords 122), that relate to, or are representative of the topic 120. For example, if the user 104 wanted to write a book about the topic 120 of "calculus," examples of keywords 122 may include "derivative," "integral," and/or "differential."

Block 406 illustrates parsing a plurality of data based at least partly on the one or more keywords. As described above with respect to FIG. 1, the service provider 102 may store, or at least have access to, various types of data 124, such as the item interaction data 126, the content consumption data 128, and the user provided data 130. The service provider 102 may determine whether the keywords 122 are present within the data 124 and, if so, determine the extent to which the keywords 122 are found within the data. The service provider 102 may also determine the extent of interaction with items that are determined to be related to at least one of the keywords 122.

Block 408 illustrates determining a user sentiment with respect to the topic based at least partly on the plurality of data. In various embodiments, the user sentiment may correspond to user sentiment data 132, which may indicate an interest level of consumers in the topic 120 or a likelihood that the topic 120 is likely to become popular amongst consumers, meaning that the topic 120 is likely to become of particular interest to consumers. As discussed below, the user sentiment of consumers with respect to the topic 120 may be based on the various types of data 124, and may represent a user demand for content items that relate to the topic 120.

In various embodiments, the item interaction data 126 may indicate the activity of consumers with respect to various items. Such activity may include the extent to which consumers have acquired (e.g., purchased, leased, rented, downloaded, etc.), viewed, selected, and/or searched for items. The items may include one of the previously identified keywords 122 or at least be associated with one of the keywords 122 and/or the topic 120. If the service provider 102 determines that there is an increase in consumer activity with respect to an item or a category of items that is determined to be related to the topic 120, then the service provider 102 may determine that the topic 120 is likely to become more popular (e.g., consumers are likely to become more interested in the topic 120). In particular, if it is determined that consumers are utilizing at least one of the keywords 122 to search for items more frequently, or are beginning to purchase items relating to the topic 120 at an increased rate, the service provider 102 may determine that there is an increased likelihood of user sentiment with respect to the topic 120.

Moreover, the content consumption data 128 may indicate the consumption behavior of consumers with respect to content items, such as eBooks. In particular, the content consumption data 128 may indicate an extent to which consumers highlight, bookmark, annotate, etc., eBooks, the frequency in which consumers read or interact with eBooks, the amount of time spent reading eBooks, or particular portions (e.g., chapters, etc.) of eBooks, the rate/velocity or acceleration in which consumers read eBooks, whether eBooks are completed or not, an amount of the eBook in which consumers have progressed to, and so on. Highlights, bookmarks, and/or annotations of a keyword 122 with respect to a content item may indicate user sentiment with respect to that content item, and the topic 120 in which it relates. Moreover, if the keyword(s) 122 appear frequently in a particular eBook, the eBook may be determined to be related to the topic 120. In that case, the service provider 102 may predict the popularity of the topic 120 based on consumers' interaction with that eBook.

At least some of the content consumption data 128 may be based on the physical behavior of consumers while consuming the content item, such as whether consumers move while consuming the content item, the rate of movement, eye gaze, head position and/or orientation, and so on. Such behavior may be captured by one or more sensors of the device used to consume the content item (e.g., a tablet computer, an eBook reader device, etc.), such as one or more cameras, motion sensors, and any other sensors. In some embodiments, the device may be associated with the service provider 102.

In addition, the user provided data 130 may indicate that consumers are particularly interested in, or are likely to become interested in, a topic 120 or item category 212. In particular, the user provided data 130 may include reviews for items that are provided by consumers. If the reviews for various items within an item category 212 begin to become more favorable, the service provider 102 may determine that the topic 120 associated with the item category 212 is likely to become popular amongst consumers. Moreover, the frequency in which consumers mention a topic 120 or item category 212, such as in forums or social networks, may indicate that the topic 120 and/or the item category 212 are likely to become popular amongst consumers.

The user provided data 130 may also include responses to questions, quizzes, exams, etc., that are included within content items, such as eBooks. More particularly, a particular eBook may include interactive features that are integrated within the eBook. While consuming the eBook, the consumer may provide responses to questions, quizzes, etc., that relate to the eBook in its entirety, particular portions of the eBook, or the item category 212 or topic 120 in which the eBook is associated with. If the responses tend to be incorrect, there may be a need for additional content items that are focused on the subject matter of those questions, quizzes, etc.

Block 410 illustrates providing, to the user device and based at least partly on the user sentiment, a recommendation with respect to the topic. In various embodiments, provided that the user sentiment data 132 indicates user demand for content items associated with the topic 120, the service provider 102 may recommend that the user 104 create a content item relating to the topic 120. The service provider 102 may make that recommendation 134 provided that a value representative of the user sentiment data 132 meets or exceeds a threshold, which may indicate that consumers are likely to become interested in the topic 120. Otherwise, the recommendation 134 may identify a different topic that the user 104 should pursue.

Figure 5:
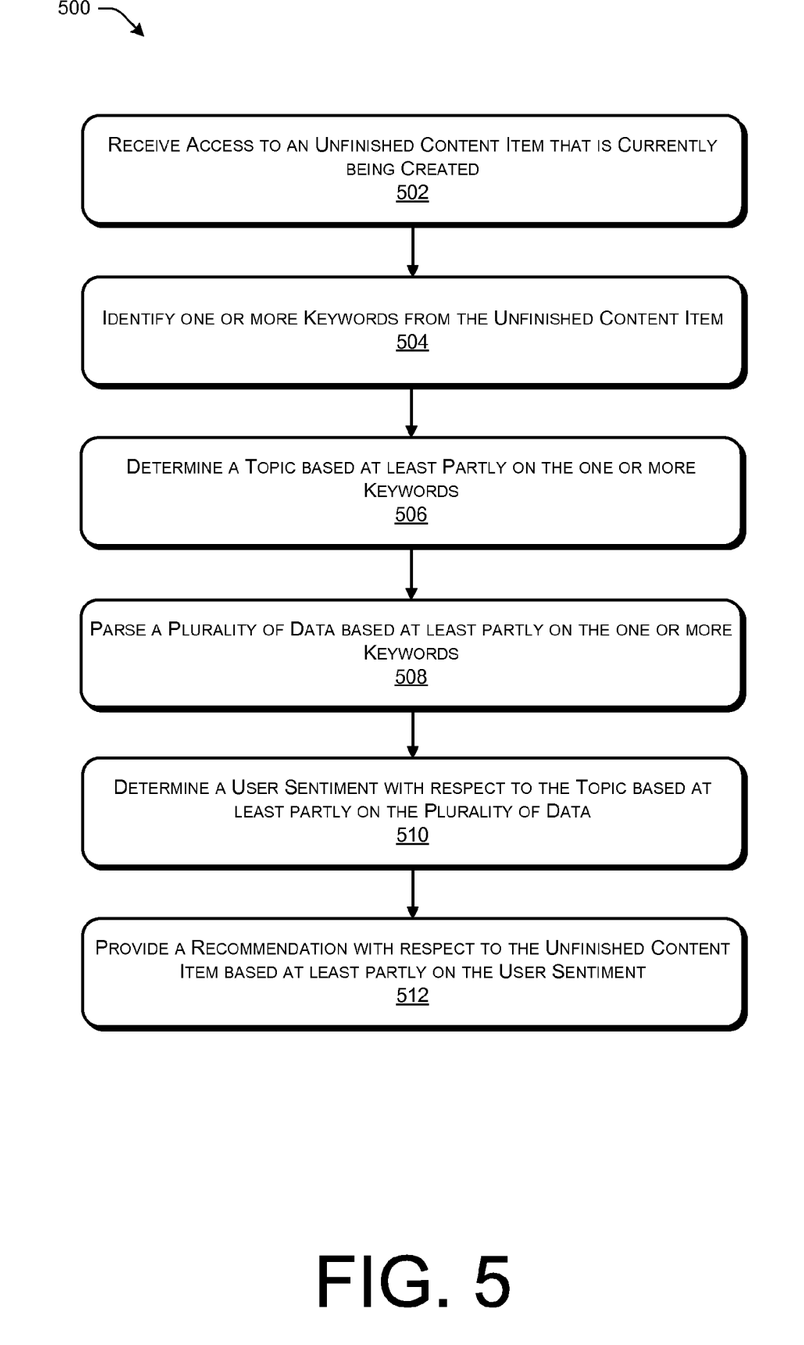
FIG. 5 is a flow diagram illustrating an example process of providing a recommendation for a content topic for an unfinished content item.

FIG. 5 is a flow diagram illustrating an example process 500 of providing guidance regarding a topic while a user is creating a content item. Moreover, the following actions described with respect to FIG. 5 may be performed by the service provider 102 and/or the content servers 108, as illustrated in, and described with respect to, FIGS. 1-3.

Block 502 illustrates receiving access to an unfinished content item that is currently being created. In some instances, a user 104 may have begun creating a content item (e.g., writing a book) and would like guidance as to whether the topic 120 associated with the content item is likely to be of interest to consumers. The user 104 may submit a request 118 to the service provider 102, where the request 118 may include a copy of the unfinished content item or otherwise provides access to the unfinished content item.

Block 504 illustrates identifying one or more keywords from the unfinished content item. Upon receiving the unfinished content item, the service provider 102 may extract one or more keywords 122 from the unfinished content item or determine one or more keywords 122 that are representative of the topic 120 in which the unfinished content item relates to.

Block 506 illustrates determining a topic based at least partly on the one or more keywords. More particularly, in the request 118, the user 104 may identify the topic 120 that is associated with the unfinished content item. In other embodiments, the user 104 may provide the unfinished content item to the service provider 102, such as via a website or a self-service interface associated with the service provider 102, and the service provide 102 may determine the topic 120 in view of the one or more keywords 122.

Block 508 illustrates parsing a plurality of data based at least partly on the one or more keywords. As described above, the service provider 102 may perform one or more searches of the data 124 utilizing the one or more keywords 122. As a result, the service provider 102 may identify instances in which the keywords 122 were mentioned, consumer interaction with items that include or relate to the keywords 122, and so on.

Block 510 illustrates determining a user sentiment with respect to the topic based at least partly on the plurality of data. Based at least partly on the parsing of the data 124, the service provider 102 may determine the user sentiment of the topic 120. That is, the service provider 102 may determine a likelihood that consumers are to remain or become interested in the topic 120, emerging trends related to the topic 120, and/or the likelihood that the topic 120 is to remain or become popular amongst consumers. The user sentiment of the topic 120 may indicate whether the user 104 should continue to create the content item relating to the previously identified topic 120, or whether the user 104 should change, adjust, or refocus the topic of the unfinished content item.

Block 512 illustrates providing a recommendation with respect to the unfinished content item based at least partly on the user sentiment. Based at least partly on the user sentiment of the topic 120, the service provider 102 may recommend that the user 104 should continue to create the content item relating to the previously identified topic 120, or whether the user 104 should change, adjust, or refocus the topic of the unfinished content item.

Figure 6:
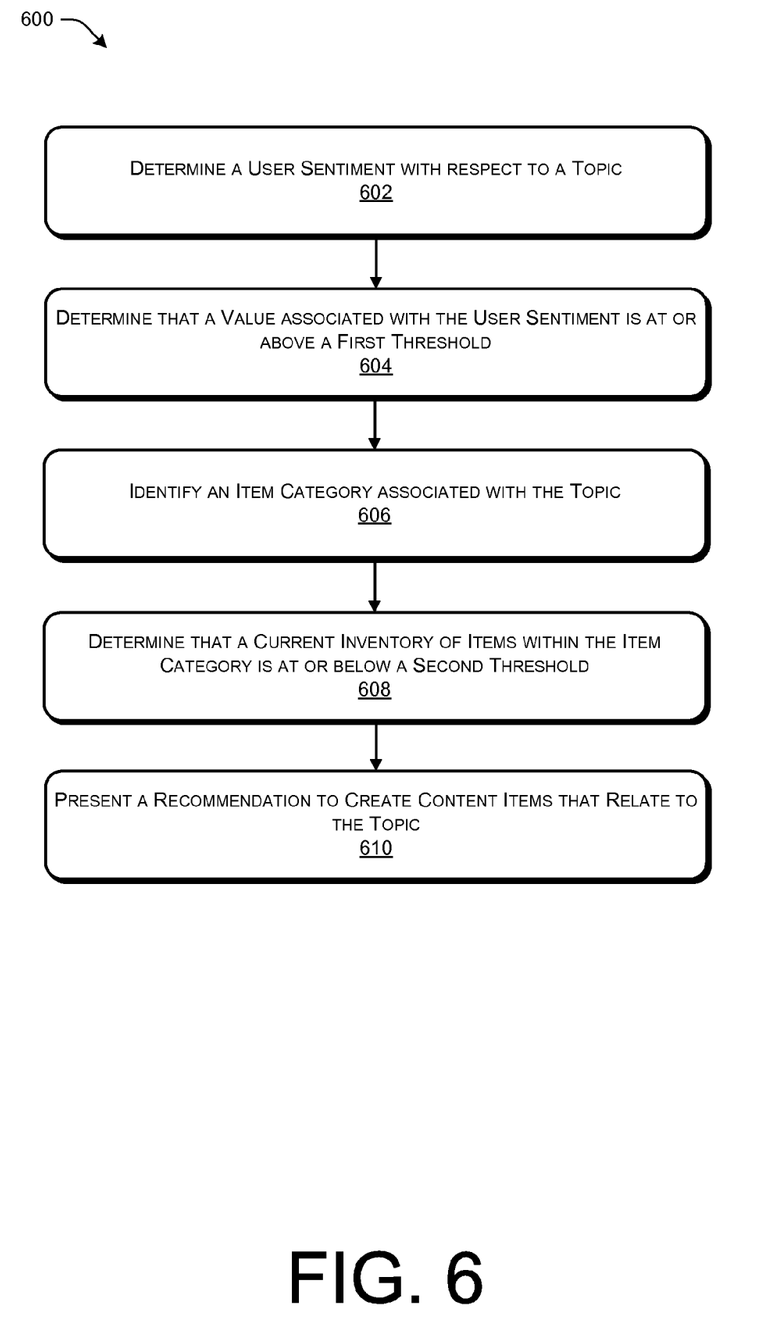
FIG. 6 is a flow diagram illustrating an example process of providing a recommendation for a content topic based at least partly on user sentiment with respect to the content topic and/or inventory data relating to a category of items.

FIG. 6 is a flow diagram illustrating an example process 600 of providing guidance for the creation of content items. Moreover, the following actions described with respect to FIG. 6 may be performed by the service provider 102 and/or the content servers 108, as illustrated in, and described with respect to, FIGS. 1-3.

Block 602 illustrates determining a user sentiment with respect to a topic. In various embodiments, the service provider 102 may determine the likelihood that a topic 208 is to become of interest to consumers and/or that the topic 208 is to become popular amongst consumers. The user sentiment of the topic 208 may be based on the data 124, which may include the item interaction data 126, the content consumption data 128, and/or the user provided data 130.

Block 604 illustrates determining that a value associated with the user sentiment is at or above a first threshold. Upon determining the user sentiment for the topic 208, the service provider 102 may determine that a value associated with the user sentiment is at or above a threshold, which may indicate that there is user demand for items within the topic 208.

Block 606 illustrates identifying an item category associated with the topic. The service provider 102 may also determine at least one item category 212 of multiple item categories 210 that is believed to be associated with the topic 208. The item category 212 may include items (e.g., physical products, digital items, services, etc.) that are determined to be related to, or fall within the scope of, the topic 208.

Block 608 illustrates determining that a current inventory of items within the item category is at or below a second threshold. In various embodiments, the service provider 102 may determine the current inventory of items within the item category 212, which may include the number of items within the item category 212 that are available for purchase and/or the types of different items within the item category 212. If the current inventory of the items within the item category 212 is below a particular threshold, the service provider 102 may determine that the current inventory is not likely to satisfy the predicted user demand for items associated with the topic 208.

Block 610 illustrates presenting a recommendation to create content items that relate to the topic. In response to determining that the current inventory does not satisfy the predicted user demand, the service provider 102 may request that users 104 create content items that relate to the topic 208 and/or the item category 212, which may help supply the predicted user demand.

Figure 7:
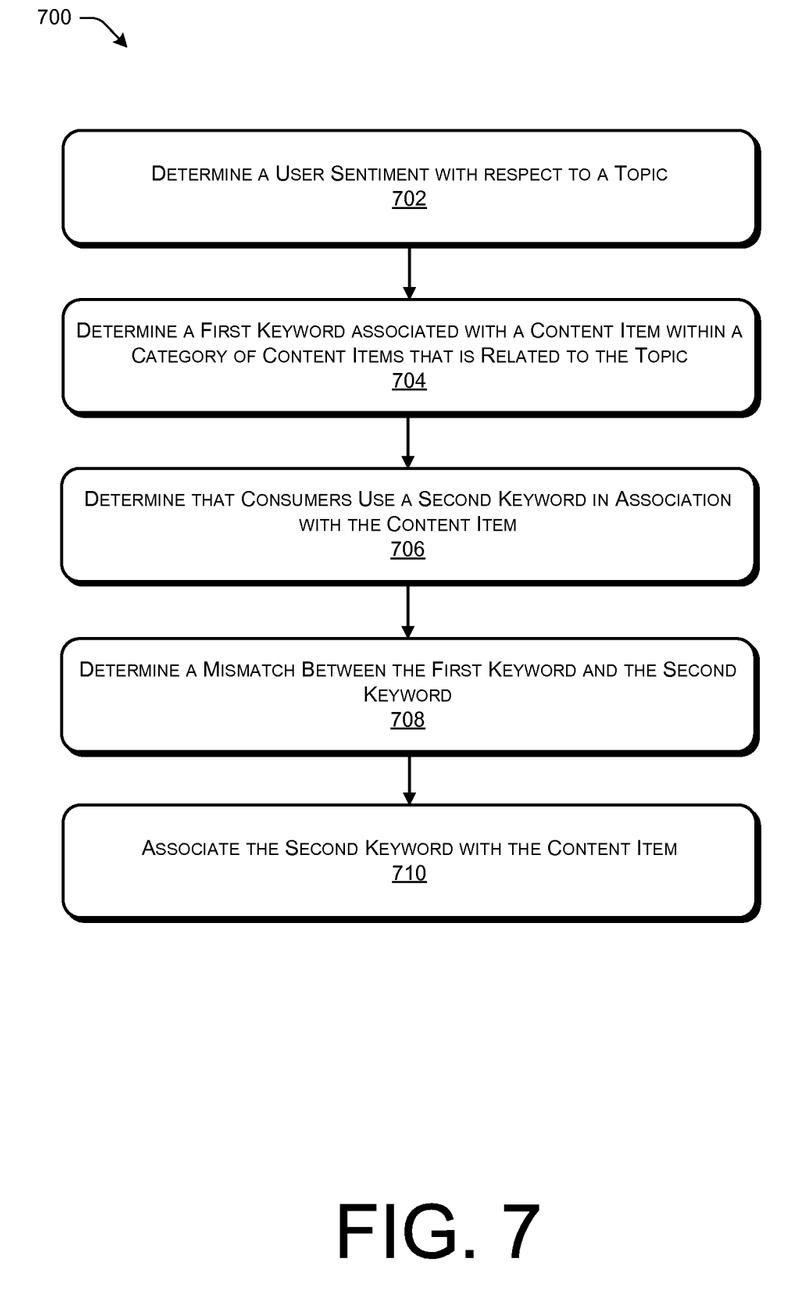
FIG. 7 is a flow diagram illustrating an example process of determining a mismatch between keywords associated with a content item.

FIG. 7 is a flow diagram illustrating an example process 700 of determining a mismatch between keywords associated with a content item. Moreover, the following actions described with respect to FIG. 7 may be performed by the service provider 102 and/or the content servers 108, as illustrated in, and described with respect to, FIGS. 1-3.

Block 702 illustrates determining a user sentiment with respect to a topic. As set forth above, based on various types of data 124, the service provider 102 may determine that a topic 208 is likely to become trending amongst consumers, meaning that the topic 208 is likely to become of particular interest to consumers.

Block 704 illustrates determining a first keyword associated with a content item within a category of content items that is related to the topic. For a particular content item relating to the topic 208, the service provider 102 may determine one or more keywords (e.g., words, phrases, etc.) associated with the topic 208. Such keywords may be terms that the author of the content item associates with the content item and/or terminology that individuals typically use to refer to the topic 208 or content relating to the topic 208.

Block 706 illustrates determining that consumers use a second keyword in association with the content item. In certain embodiments, the service provider 102 may determine that consumers typically refer to the topic 208 and/or content relating to that topic 208 utilizing a different keyword, or set of keywords. That is, instead of referring to the topic 208 and/or the content using the first keyword, consumers instead refer to the topic 208 and/or the content using a second, different keyword. The service provider 102 may determine the terminology that consumers use when referring to the topic 208 based on various sources. Such sources may include a website associated with the service provider. Based on consumer searches for items, user feedback relating to the website/topic 208, reviews/ratings provided for content items, etc., the service provider 102 may identify terminology that consumers typically use when referring to the topic 208. The service provider 102 may also determine how consumers refer to the topic 208 via one or more social networks, or in any other manner.

Block 708 illustrates determining a mismatch between the first keyword and the second keyword. Upon determining the first keyword and the second keyword, the service provider 102 may determine that the first keyword and the second keyword are in fact different. That is, terminology that the service provider 102 and/or the authors typically use to refer to the topic 208/content may be different than that used by consumers, such as individuals that are interested in that particular topic 208. As a result, there is a mismatch between how the service provider 102, authors, and/or consumers refer to the topic 208 and/or content related to the topic 208.

Block 710 illustrates associating the second keyword with the content item. In response to determining that consumers refer to the topic 208/content in a manner that is different from the service provider 102 and/or authors that create content items relating to the topic 208, the service provider 102 may associate the terminology used by consumers with the content item.

Accordingly, based on a determination that a topic 208 that is likely to become trending and become of interest to consumers, the service provider 102 may determine items in an item catalog that are also likely to become of interest to consumers. However, in some instances, such items may not be associated with keywords that allow consumers to find and acquire those items. In some embodiments, the relevant items may not be associated with keywords that are relevant to the topic 208. As a result, when consumers search for items in an item catalog using these keywords, the relevant items likely will not appears in the search results presented to consumers. In other embodiments, the relevant items may be mislabeled, meaning that the keywords associated with the relevant items are not the same as the terminology consumers typically use when referring to the topic 208. Again, in this scenario, consumers may not be able to locate these relevant items. Due to the mismatch in terminology, the service provider 102 may associate more relevant keywords with those items. By associating terminology that consumers typically use with respect to the topic 208/content, consumers are more likely to find relevant items, and acquire them as a result.

As an illustrative example, based at least partly on the data 124, the service provider 102 may determine that the topic 208 of "werewolves" is likely to become trending amongst consumers. That is, the service provider 102 may determine that consumers are likely to become particularly interested in books relating to "werewolves." Here, the service provider 102 and/or the author(s) of content items relating to "werewolves" might have associated this term with their content items relating to this topic 208. However, the service provider 102 may subsequently determine that consumers instead typically refer to "werewolves" as "manwolves," or some other term. When consumers search the website of the service provider 102 for "manwolves," items that are associated with the term "werewolves," but not "manwolves," may not be returned to the consumers. As a result, although the service provider 102, the authors, and the consumers may be referring to the same topic 208, genre, category, etc., the consumers may not be able to identify content that relates to what they are searching for, and the service provider 102/authors may not be able to return items that satisfy the perceived user demand. Since the content items relating to the topic 208 may be mislabeled or mischaracterized, consumers may not be able to identity content items that are likely of interest to the consumers, but that are in fact available.

As a result of determining such a mismatch between terminology used by the service provider 102, authors, and/or consumers when referring to the same topic 208, the service provider 102 and/or the authors may also associate the keywords typically used by the consumers to the content items. Instead of having to request that authors/merchants create new content items to satisfy the perceived user demand, the service provider 102 and/or authors may modify the keywords that are associated with various content items relating to the topic 208. The service provider 102 may also associate such keywords to other content items that are determined to be related to the content items discussed above. Moreover, when providing topic recommendations 218 to users 104 (e.g., authors), the service provider 102 may suggest that the users 104 modify the keywords currently associated with their content items, or associate additional keywords with their content items.

Using the example above, the users 104 may subsequently user "manwolves" when referring to their content items, or associate both "werewolves" and "manwolves" with their content items. The service provider 102 and/or the users 104 may associate the keywords with content items by including such keywords in metadata of the content items, and/or maintaining the keywords in a database or data structure that includes information about the content items.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
memory; and
one or more computer-executable instructions stored in the memory and executable by the one or more processors to perform operations comprising:
receiving purchase history data representing past user interaction with books available for download from a website, the receiving including receiving category data indicating that a first book of the books is within a first category;
analyzing the category data to identify multiple topics that are related to the first category, the analyzing including identifying keywords within the category data that are representative of the multiple topics;
determining a value that represents user interest for a first topic of the multiple topics over time, the value corresponding to a frequency of the keywords within the category data at a particular time;
determining that the first topic has an increase in the value over time that is greater than a first threshold;
determining that a current inventory of items within the first category is below a second threshold, the current inventory corresponding to a number of the items included in the first category; and
based at least partly on the value meeting or exceeding the first threshold and the current inventory being below the second threshold, presenting a recommendation to create content items associated with the first category, the recommendation being generated based at least partly on an algorithm that indicates a number of books written by an author that is a recipient of the recommendation.

2. The system as recited in claim 1, wherein the operations further comprise:
receiving, from a user device, a copy of an unfinished book relating to the first topic;
extracting one or more keywords included within the copy of the unfinished book by determining that the one or more keywords are most representative of the first topic;
determining a frequency in which a first keyword of the one or more keywords appears in the category data to determine the user interest in the first topic; and
presenting a second recommendation relating to the topic.

3. The system as recited in claim 1, wherein the analyzing the category data to identify the multiple topics includes:
determining one or more keywords that are representative of the first topic, the one or more keywords being determined based on data that indicates purchases of books associated with the first topic;
searching the category data utilizing the one or more keywords;
determining a frequency in which the one or more keywords are present within the category data; and
determining that the increase in the value over time is greater than the first threshold based at least partly on the frequency in which the one or more keywords are present within the category data.

4. A method comprising:
determining a topic associated with a request for guidance regarding a creation of a content item;
identifying one or more keywords associated with the topic;
determining, by one or more computing devices, an expected level of user interest in the topic by searching data using the one or more keywords, the data including at least user interaction with items made available for acquisition;
determining that the expected level of user interest in the topic meets or exceeds a threshold; and
presenting a recommendation to create content relating to the topic, the presenting the recommendation including determining a user to receive the recommendation based at least partly on the user previously creating content items relating to the topic.

5. The method as recited in claim 4, further comprising determining an extent to which the one or more keywords are present in the data, and the determining that the expected level of user interest in the topic meets or exceeds the threshold is based at least partly on the extent to which the one or more keywords are present in the data.

6. The method as recited in claim 4, further comprising, based at least partly on the expected level of user interest in the topic meeting or exceeding the threshold, determining that the recommendation is to create the content relating to the topic.

7. The method as recited in claim 4, further comprising:
determining that a second expected level of interest in a second topic different from the topic is greater than the expected level of interest in the topic; and
determining that the recommendation is to create a second content item relating to the second topic.

8. The method as recited in claim 4, further comprising:
receiving, from the user device, a copy of an unfinished content item relating to the topic;
extracting at least one keyword from the copy of the unfinished content item;
predicting a second expected level of user interest in the topic based at least partly on the data; and
presenting a second recommendation relating to the topic.

9. The method as recited in claim 8, further comprising determining that the second recommendation is to at least one of:
continue creating the unfinished content item;
revise the unfinished content item to relate to a second topic different from the topic; or
revise the unfinished content item to expand on a portion of the unfinished content item.

10. The method as recited in claim 4, further comprising determining that the user interaction with the items offered for acquisition includes an extent to which the items were at least one of acquired, viewed, searched for, selected, or added to a saved-items list.

11. The method as recited in claim 4, wherein the items include electronic books (eBooks), and further comprising determining that the data includes user behavior while consuming individual ones of the eBooks, the user behavior including at least one of highlighting text, making annotations, creating bookmarks, a frequency of access of the eBooks, an amount of time spent consuming the eBooks, a consumption rate of the eBooks, or an extent to which the eBooks were completed.

12. The method as recited in claim 4, further comprising determining that the data includes user provided information, the user provided information including at least one of user reviews provided by users, interests or preferences of the users, references to the items or the one or more keywords in one or more forums, or references to the items or the one or more keywords via one or more social network sites.

13. The method as recited in claim 4, further comprising determining the expected level of user interest in the topic based at least partly on a frequency in which the one or more keywords are associated with the items made available for acquisition, the user interaction with the items made available for acquisition including data that represents at least one of purchasing behavior, searching behavior, downloading behavior, or consumption behavior with respect to the items made available for acquisition.

14. A system comprising:
one or more processors;
memory; and
one or more computer-executable instructions stored in the memory and executable by the one or more processors to perform operations comprising:
determining an increase in user interest with respect to a topic based at least partly on data;
determining an item category of a plurality of item categories that is associated with the topic;
determining at least one of:
that a value associated with the increase in user interest meets or exceeds a first threshold; or
that a current inventory of items within the item category is below a second threshold; and
presenting a recommendation to create content items associated with the item category the presenting the recommendation including determining a user to receive the recommendation based at least partly on the user previously creating content items relating to the topic.

15. The system as recited in claim 14, wherein the operations further comprise determining that the current inventory corresponds to at least one of a number of the items included in the item category or types of the items included in the item category.

16. The system as recited in claim 14, wherein the operations further comprise:
determining one or more keywords that are associated with the topic;
searching the data utilizing the one or more keywords; and
determining a frequency in which the one or more keywords are present within the data,
wherein the determining the increase in the user interest with respect to the topic is based at least partly on the frequency in which the one or more keywords are present within the data.

17. The system as recited in claim 14, wherein the operations further comprise determining to increase the current inventory of items within the item category to satisfy the increase in user interest determined for the topic.

18. The system as recited in claim 14, wherein the operations further comprise determining that the data includes at least one of:
an extent of user interaction with a plurality of items that are included in the plurality of item categories and that are being offered for acquisition;
user actions performed with respect to the plurality of items while the plurality of items are being consumed;
user reviews for the plurality of items; or
references to the one or more keywords.

19. The system as recited in claim 14, wherein the operations further comprise:
receiving, from a user device associated with the user, a copy of a content item; and
verifying that the content item relates to at least one of the topic or the item category.

20. The system as recited in claim 14, wherein the operations further comprise determining that the data indicates that a user searched for an item of the plurality of items via a website associated with a service provider, but did not purchase the item from the website.

* * * * *